(12) United States Patent
Balsiger

(10) Patent No.: US 11,149,834 B2
(45) Date of Patent: Oct. 19, 2021

(54) COMPACT COMPOUND HARMONIC DRIVE ASSEMBLY CONFIGURED FOR CONTINUOUS OUTPUT ROTATION

(71) Applicant: Hamilton Sundstrand Corporation, Charlotte, NC (US)

(72) Inventor: Derick S. Balsiger, Mayer, AZ (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 226 days.

(21) Appl. No.: 16/673,035

(22) Filed: Nov. 4, 2019

(65) Prior Publication Data

US 2021/0131544 A1    May 6, 2021

(51) Int. Cl.
    *F16H 49/00*    (2006.01)

(52) U.S. Cl.
    CPC ..... *F16H 49/001* (2013.01); *F16H 2049/003* (2013.01)

(58) Field of Classification Search
    CPC .......................... F16H 49/001; F16H 2049/003
    See application file for complete search history.

(56) References Cited

U.S. PATENT DOCUMENTS

| 5,820,504 | A | * | 10/1998 | Geralde | ................. | F16H 48/12 |
| | | | | | | 475/177 |
| 9,915,334 | B2 | | 3/2018 | Balsiger et al. | | |
| 10,400,878 | B2 | | 9/2019 | Balsiger et al. | | |
| 2006/0119033 | A1 | | 6/2006 | Davis | | |
| 2006/0283289 | A1 | | 12/2006 | Baudendistel et al. | | |
| 2018/0038467 | A1 | | 2/2018 | Balsiger et al. | | |
| 2019/0063578 | A1 | | 2/2019 | Bloxham et al. | | |
| 2020/0141478 | A1 | * | 5/2020 | Chung | ................... | F16H 21/18 |

FOREIGN PATENT DOCUMENTS

| DE | 10024908 A1 | 11/2001 | | |
| DE | 202008017572 U1 | * | 3/2010 | ........... F16H 49/001 |
| EP | 3279513 A1 | * | 2/2018 | ............. B64C 13/34 |
| EP | 3279513 A1 | | 2/2018 | |
| EP | 3312475 A2 | | 4/2018 | |

OTHER PUBLICATIONS

European Search Report; Application No. 20205366.6-1012; dated Mar. 3, 2021; 10 pages.

* cited by examiner

*Primary Examiner* — Terence Boes
(74) *Attorney, Agent, or Firm* — Cantor Colburn LLP

(57) ABSTRACT

Disclosed is a compound harmonic drive including: an inner ring gear including a first set of gear teeth; a flex spline including a flex spline inner ring and a flex spline outer ring, the flex spline inner ring forms a second set of gear teeth that engage the first set of gear teeth and the flex spline outer ring forms a third set of gear teeth; an outer ring gear including a fourth set of gear teeth that are engaged by the third set of gear teeth; and a wave generator disposed between the flex spline inner ring and the flex spline outer ring, wherein the gear system rotates about an axis and each set of gear teeth is axially aligned with each other and radially offset from each other about the axis.

20 Claims, 4 Drawing Sheets

COMPACT COMPOUND HARMONIC DRIVE ASSEMBLY CONFIGURED FOR CONTINUOUS OUTPUT ROTATION

BACKGROUND

Exemplary embodiments pertain to the art of gear configurations and more specifically to a compact compound harmonic drive configured for continuous output rotation.

Compound harmonic drives enable achieving a high-power density. Such drives may be used in machinery requiring high torque output at low speeds. Such drives may also be compact and lightweight.

BRIEF SUMMARY

Disclosed is a compound harmonic drive including: an inner ring gear including a first set of gear teeth; a flex spline including a flex spline inner ring and a flex spline outer ring, the flex spline inner ring forms a second set of gear teeth that engage the first set of gear teeth and the flex spline outer ring forms a third set of gear teeth; an outer ring gear including a fourth set of gear teeth that are engaged by the third set of gear teeth; and a wave generator disposed between the flex spline inner ring and the flex spline outer ring, wherein the gear system rotates about an axis and each set of gear teeth is axially aligned with each other and radially offset from each other about the axis.

In addition to one or more of the above disclosed aspects or as an alternate the first set of gear teeth on the inner ring gear faces outwardly to be engaged by the second set of gear teeth on the flex spline inner ring.

In addition to one or more of the above disclosed aspects or as an alternate the fourth set of gear teeth on the outer ring gear faces inwardly to be engaged by the third set of gear teeth on the flex spline outer ring.

In addition to one or more of the above disclosed aspects or as an alternate the wave generator is axially aligned with each set of gear teeth.

In addition to one or more of the above disclosed aspects or as an alternate the wave generator forms an inner surface profile that faces the inner ring gear and an outer surface profile that faces the outer ring gear, both are non-circular.

In addition to one or more of the above disclosed aspects or as an alternate the inner surface profile and the outer surface profile of the wave generator both include a plurality of lobes, wherein the lobes on the inner surface profile are circumferentially offset from the lobes on the outer surface profile.

In addition to one or more of the above disclosed aspects or as an alternate the inner surface profile and the outer surface profile of the wave generator are different from one another.

In addition to one or more of the above disclosed aspects or as an alternate the inner ring gear, the outer ring gear and the wave generator each have a same axial thickness.

In addition to one or more of the above disclosed aspects or as an alternate, the drive further includes a set of wave generator inner bearings between the wave generator and the flex spline inner ring, the set of wave generator inner bearings being axially aligned with each set of gear teeth.

In addition to one or more of the above disclosed aspects or as an alternate, wherein the drive further includes a set of wave generator outer bearings between the wave generator and the flex spline outer ring, the set of wave generator outer bearings being axially aligned with each set of gear teeth.

In addition to one or more of the above disclosed aspects or as an alternate the set of wave generator inner bearings and the set of wave generator outer bearings have the same axial thickness as the wave generator.

In addition to one or more of the above disclosed aspects or as an alternate the set of wave generator inner bearings and the set of wave generator outer bearings are journal bearings.

In addition to one or more of the above disclosed aspects or as an alternate the flex spline inner ring and the flex spline outer ring are connected to one another by a cup-shaped extension.

In addition to one or more of the above disclosed aspects or as an alternate the cup-shaped extension forms a base that is axially spaced apart from each set of gear teeth.

In addition to one or more of the above disclosed aspects or as an alternate the cup-shaped extension includes an inner side wall that forms the flex spline inner ring, and an outer side wall that forms the flex spline outer ring.

In addition to one or more of the above disclosed aspects or as an alternate the inner ring gear forms a center opening to receive a shaft.

Further disclosed is a method of transmitting rotational motion through a compound harmonic drive including: rotating the wave generator of a gear system as an input; rotating a flex spline of the gear system by the rotating wave generator, wherein the flex spline includes a flex spline inner ring and a flex spline outer ring, and wherein the inner ring gear forms a first set of gear teeth, the flex spline inner ring forms a second set of gear teeth that engage the first set of gear teeth, the flex spline outer ring forms a third set of gear teeth, the outer ring gear forms a fourth set of gear teeth that are engaged by the third set of gear teeth, and a wave generator is disposed between the flex spline inner ring and the flex spline outer ring; and rotating the inner ring gear or the outer ring gear by the rotating of the flex spline, wherein the drive rotates about an axis and each set of gear teeth is axially aligned with each other and radially offset from each other about the axis.

In addition to one or more of the above disclosed aspects or as an alternate, the method includes grounding the outer ring gear, thereby rotating the inner ring gear as an output gear.

In addition to one or more of the above disclosed aspects or as an alternate the method includes at least one of meshing the first set of gear teeth and the second set of gear teeth according to an inner surface profile of the wave generator and meshing the third set of gear teeth and the fourth set of gear teeth according to an outer surface profile of the wave generator, wherein the inner and outer surface profiles each include a plurality of lobes.

In addition to one or more of the above disclosed aspects or as an alternate, the method includes meshing both the first set of gear teeth and the second set of gear teeth according to the inner surface profile of the wave generator and meshing the third set of gear teeth and the fourth set of gear teeth according to the outer surface profile of the wave generator, wherein the lobes on the inner surface profile are circumferentially offset from the lobes on the outer surface profile.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

In prior art systems and machinery, a compound harmonic drive may be utilized to provide a high power density. The gears of the prior art drive may be axially adjacent one another. Such configuring may lead to a utilization of a relatively complex flex spline that may be difficult to manufacture. In addition, due to an intentional high gear ratio of the prior art drive, a rotating inertia (e.g. mass) of a wave generator of the drive may be large, which may reduce a system response.

As discussed in greater details below, the disclosed embodiments utilize a compound harmonic drive with gears that are radially adjacent one another rather than being axially adjacent. More specifically, the compound harmonic drive of the disclosed embodiments utilizes a flex spline that includes teeth that face outwardly to engage with inwardly facing teeth of a circular gear that surrounds the flex spline. The flex spline of the disclosed embodiments also includes teeth that face inwardly to engage outwardly facing teeth of another circular gear. The wave generator of the disclosed embodiments is located between the sets of teeth of the flex spline. The wave generator of the disclosed embodiments has a wave generator profile that is shaped both on an inside surface and an outside surface. The drive of the disclosed embodiments is configured for continuous output, is relatively short so it has a relatively low rotating inertia and is minimally complex so it is relatively simple to manufacture. Further due to a reduced overall length a higher torque density is realized if the working volume is constrained more by length than diameter.

While the wave generator profile is shaped both on the inside and outside surface in the disclosed embodiments, in an alternative embodiment the wave generator may have offset inner and outer lobes, a different number of inner and outer lobes, and/or lobes having different amplitudes on the inner surface of the wave generator and/or the outer surface of the wave generator. For example the wave generator could have three outer lobes and two inner lobes, giving it an ability to have a potentially greater range of compound gear ratios.

Figure 1:
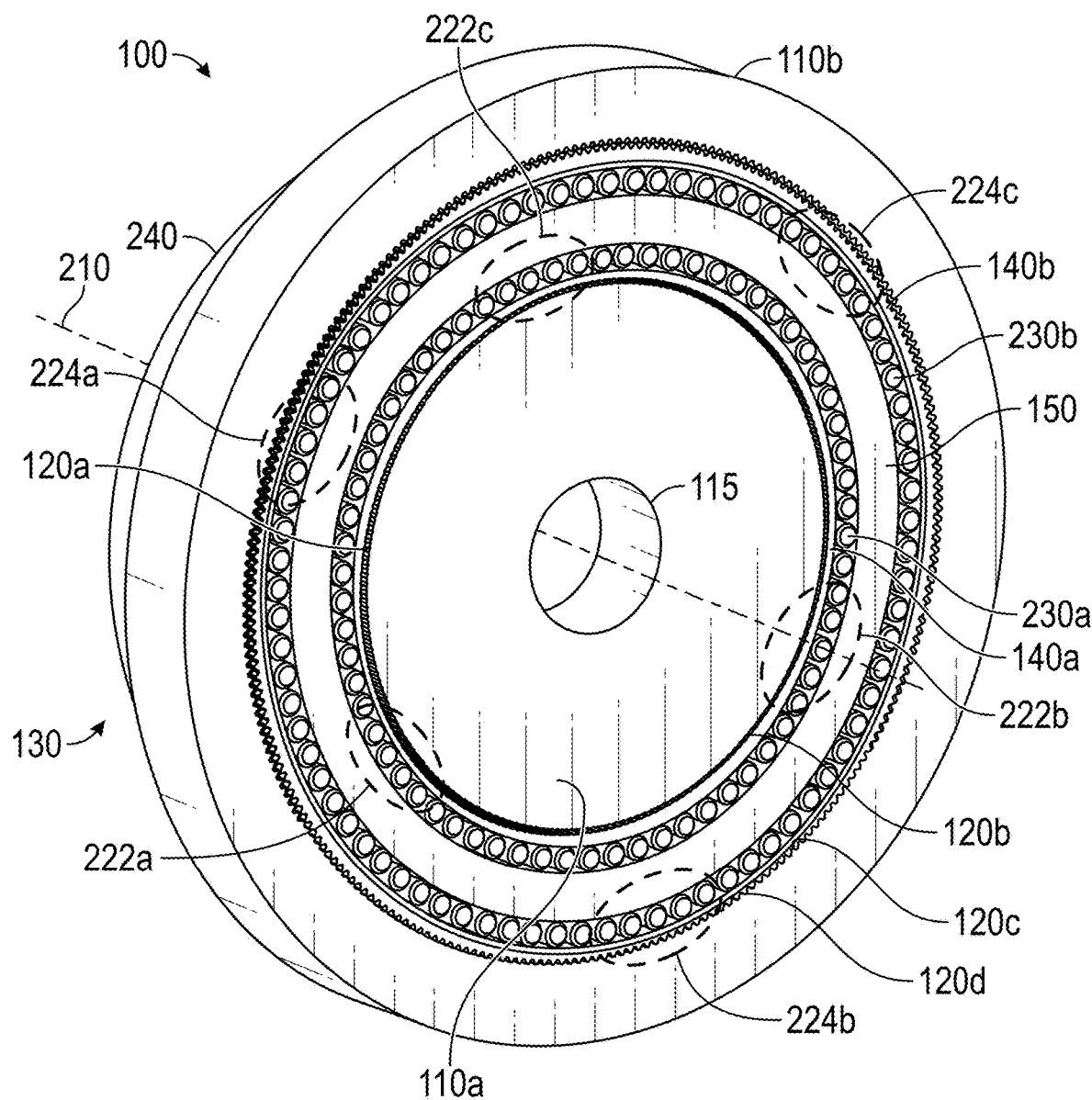
FIG. 1 shows a compound harmonic drive according to an embodiment.

Turning now to FIG. 1, a compound harmonic drive (drive) 100 is shown in a perspective view. The system 100 includes a ring gear 110 that that includes an inner ring gear 110a and an outer ring gear 110b. Located centrally within the inner ring gear 110a is a center opening 115 to receive a shaft 117 (illustrated schematically in FIG. 4). The shaft 117 can be either ground or output shaft depending on the context. The inner ring gear 110a has a first set of gear teeth 120a on an outer surface thereof. A more detailed depiction of the first set of gear teeth 120 is illustrated in FIGS. 2-3.

One or more elements are located between the inner and outer ring gears 110a, 110b so that energy can be transferred between the two. As illustrated in FIG. 1, in one embodiment, these elements can include a flex spine 130. The flex spine 130 is formed such that it includes a flex spine inner ring 140a and a flex spine outer ring 140b that are connected to one another by a flex spine base 250 (FIGS. 2-3). A wave generator 150 is located between the flex spine inner ring 140a and the flex spine outer ring 140b. In the disclosed embodiments the wave generator 150 may function as the input shaft.

Figure 2:
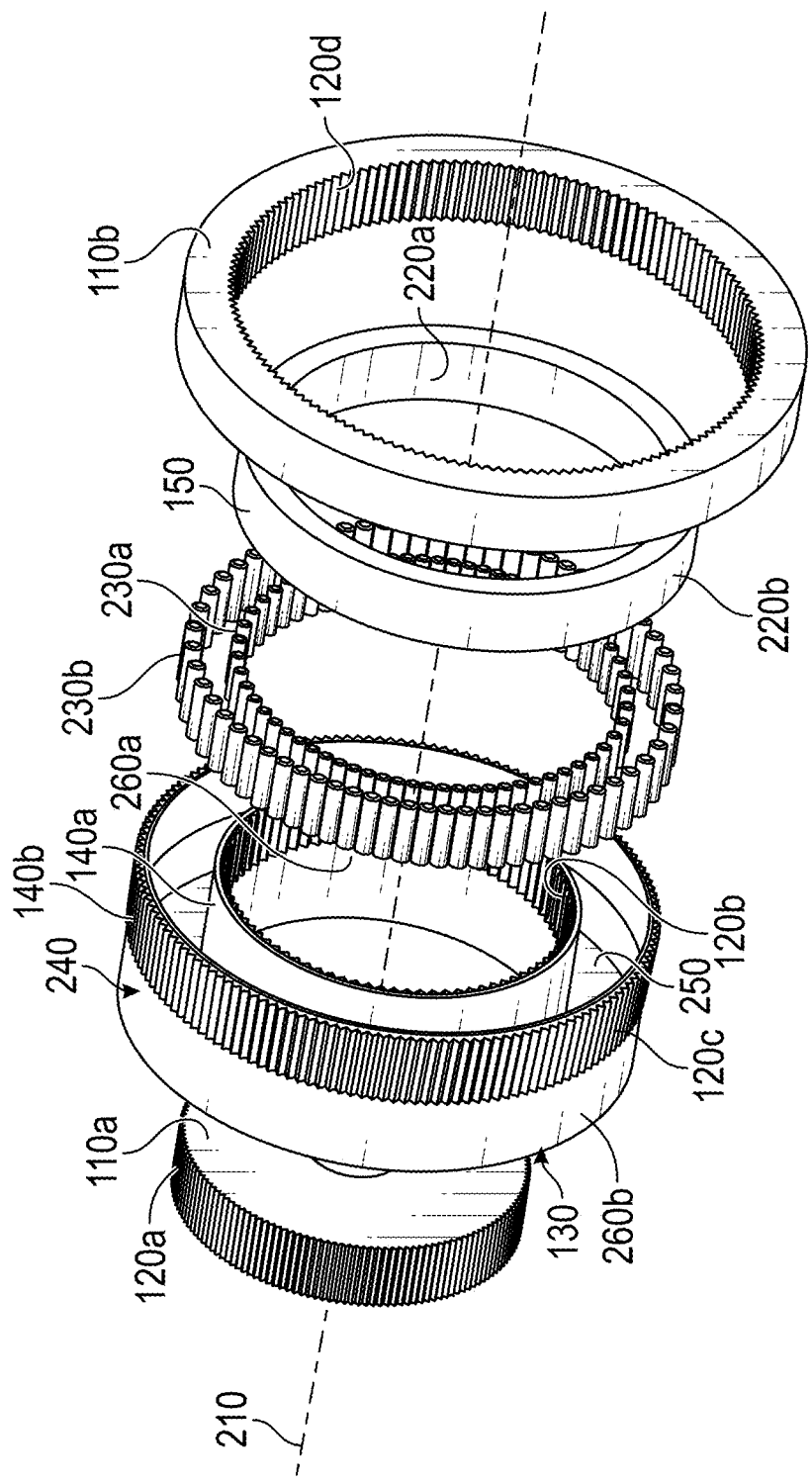
FIG. 2 is an exploded view of the drive of FIG. 1.
Figure 4:
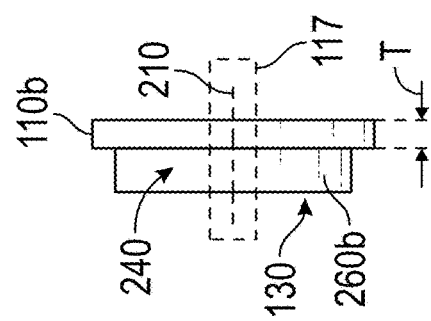
FIG. 4 is a side view of the drive of FIG. 1.
Figure 3:
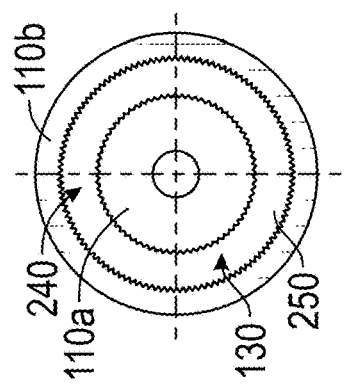
FIG. 3 is a rear view of the drive of FIG. 1.

With reference now to FIGS. 2 and 3, the flex spine inner ring 140a has a second set of gear teeth 120b that extend inwardly from an inner surface of thereof and engage the first set of gear teeth 120a (FIGS. 2-3). The flex spline outer ring 140b has a third set of gear teeth 120c that extend outwardly from an outer surface of thereof. A fourth set of gear teeth 120d extend inwardly from an inner surface of the outer ring gear 110b and be engaged by the third set of gear teeth 120c. The wave generator 150 is disposed between the flex spine inner and outer rings 140a, 140b. In one embodiment, the ring gears 110a, 110b and the wave generator 150 each have a same axial thickness T as is best seen in FIG. 4.

Figure 5:
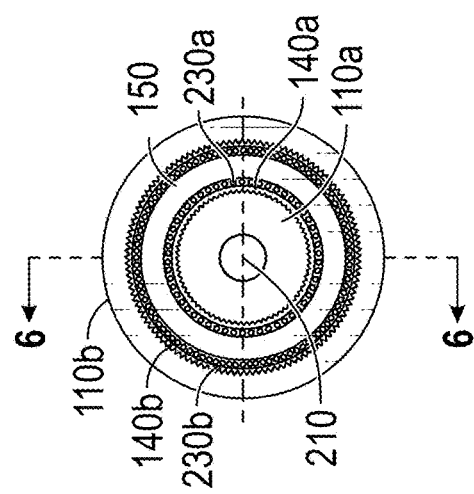
FIG. 5 is a front view of the drive of FIG. 1.

In operation, the drive 100 rotates about an axis 210. Each set of gear teeth 120a-120d is axially aligned with each other relative to the axis 210 and have successively large radii measured from the axis 210 (FIG. 5). As discussed above, the first set of gear teeth 120a on the inner ring gear 110a may extend outwardly to be engaged by the second set of gear teeth 120b on the flex spline inner ring 140a. The fourth set of gear teeth 120d on the outer ring gear 110b may extend inwardly to be engaged by the third set of gear teeth 120c on the flex spline outer ring 140b.

The wave generator 150 is axially aligned with each set of gear teeth 120. The wave generator 150 forms an inner surface profile 220a (FIG. 2) that faces the inner ring gear 110a. The wave generator 150 forms an outer surface profile 220b (FIG. 2) that faces the outer ring gear 110b. In the disclosed embodiment both of the surface profiles 220 are non-circular and are different from one another.

More specifically, the inner surface profile 220a of the wave generator 150 includes three lobes 222a-c (FIG. 1) and the outer surface profile 220b also includes three lobes 224a-c (FIG. 1). On each profile, the lobes are spaced equidistant from one another (e.g., 120 degrees apart for a three-lobe configuration). The surface of a wave generator 150 is a sinusoidal deviation from a circular profile with the period of the sinewave equal to the number of lobes. For example, a two lobe wave generator takes the form of an ellipse. The lobes outwardly bias the flex spline inner and outer rings 140a, 140b during rotation of the wave generator 150. This enables a localized meshing engagement to occur between the flex spline 130 and the inner and outer ring gears 110a, 110b, which otherwise would not mesh with one another. The localized meshing is also identified generally with reference numbers 222a-c and 242a-c, i.e., in the areas near the respective lobes identified by the reference numbers. As indicated above, this lobe configuration is not intended on being exclusive or limiting. This interaction provides the harmonic motion of the drive. In other words, both surfaces of the wave generator may be circular but the wave generators axis of revolution and circular axises of the respective surfaces may be different, i.e., circumferentially offset. This would provide a one tooth differential on the inner and outer harmonic interfaces, providing a relatively high gear ratio, a relative loss of tooth number contacts and a relative reduction in torque carrying capacity.

A set of wave generator inner bearings 230a is between the wave generator 150 and the flex spline inner ring 140a. A set of wave generator outer bearings 230b is between the wave generator 150 and the flex spline outer ring 140b. The wave generator inner and outer bearings are generally referred to by reference number 230 and are axially aligned with both one another and the sets of gear teeth 120. The wave generator bearings 230 have the same axial thickness as the wave generator 150 in one embodiment. In one embodiment, the plurality of sets of wave generator bearings 230 are journal bearings.

Figure 6:
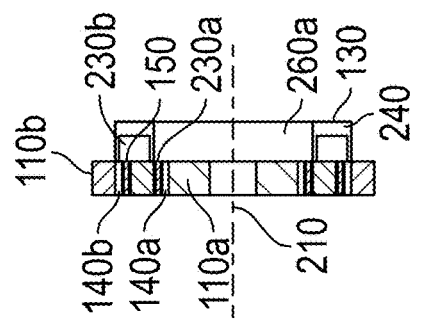
FIG. 6 is a cross sectional view along section lines D-D of the drive as shown in FIG. 5.

The inner and outer flex spline rings 140a, 140b are connected to one another by a cup-shaped extension 240. The cup-shaped extension 240 forms a base 250 that is axially spaced apart from each set of gear teeth 120. The cup-shaped extension 240 forms an inner side wall 260a (FIG. 6), a portion of which forms the flex spline inner ring 140a. The cup-shaped extension 240 forms an outer side wall 260b (FIG. 4), a portion of which forms the flex spline outer ring 140b. The inner and outer rings 140 of the flex spline 120 may also be connected by a bolted interface rather than the cup-shaped extension 240. Other configurations that connect the rings 140a, 140b are within the scope of the disclosure.

The plurality of ring gears 110 and the flex spline 130 are configured to mesh according to different harmonic gear ratios. The first set of gear teeth 120a and the second set of gear teeth 120b have a first harmonic gear ratio (Ratio 1, below). The third set of gear teeth 120c and the fourth set of gear teeth 120d have a second harmonic gear ratio (Ratio 2, below) that differs from the first gear ratio. The different harmonic gear ratios together form a compound gear ratio (Compound Ratio, below). The compound gear ratio provides a differential motion between the plurality of ring gears 110.

The compound gear ratio is represented as the difference of the individual gear ratios:

$$\text{Ratio 1} = \frac{\text{Teeth in second set } 120b}{\text{Teeth in second set } 120b - \text{Teeth in first set } 120a \text{ (e.g. output gear)}}$$

$$\text{Ratio 2} = \frac{\text{Teeth in third set } 120c}{\text{Teeth in third set } 120c - \text{Teeth in fourth set } 120d \text{ (e.g. input gear)}}$$

$$\text{Compound Ratio} = \frac{1}{\frac{1}{\text{Ratio 1}} - \frac{1}{\text{Ratio 2}}}$$

With the above configuration either the outer ring gear 110b or the inner ring gear 110a is grounded. The wave generator 150 is rotated. The gear 110a or 110b that is not grounded rotates at a ratio of speed reduced by the compound harmonic gear ratio, and achieves a torque increased by the compound harmonic gear ratio.

Figure 7:
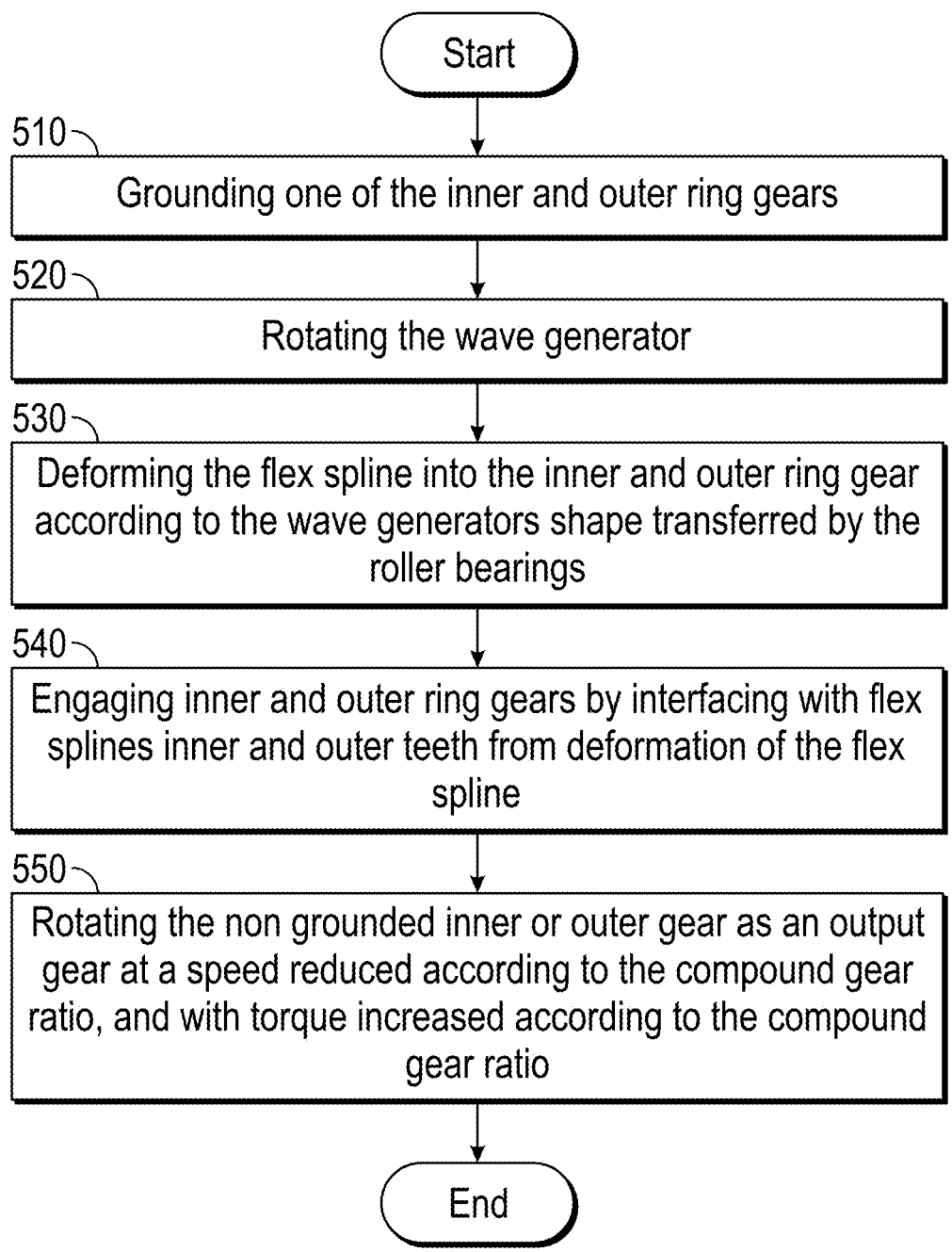
FIG. 7 is a flowchart of a method of operating the drive of FIG. 1 according to an embodiment.

FIG. 7 is a flowchart showing a method of transmitting rotational motion between an input and an output with the drive 100. As shown in block 510 the method includes grounding one of the inner ring gear 110a and the outer ring gear 110b. In one embodiment the outer ring gear 110b serves as the ground gear, and the inner ring gear 110a serves as the output gear. For example the outer ring gear 110b may be part of a frame and inner ring gear 110a may include a shaft that connects to a workpiece intended to receive reduced speed and increased torque compared with the input.

As shown in block 520 the method includes rotating the flex spline 130 by the rotating wave generator. As indicated the flex spline 130 includes the flex spline inner ring 140a and the flex spline outer ring 140b. As also indicated the inner ring gear 110a forms the first set of gear teeth 120a and the flex spline inner ring 140a forms the second set of gear teeth 120b that engage the first set of gear teeth 120a. As further indicated the flex spline outer ring 140b forms the third set of gear teeth 120c and the outer ring gear 110b forms the fourth set of gear teeth 120d that are engaged by the third set of gear teeth 120c. Additionally as indicated the wave generator 150 is disposed between the flex spline inner ring 140a and the flex spline outer ring 140b.

As shown in block 530 the method includes deforming the flex spline 150 into the inner and outer ring gears 110a, 110b according to the shape of the wave generator 150 transferred by the wave generator inner and outer bearings 230a, 230b. As shown in block 540 the method includes engaging inner and outer ring gears 110a, 110b by interfacing with the inner ring teeth and outer ring teeth 120b, 120c from deformation of the flex spline 150. As shown in block 550 the method includes rotating the non-grounded inner or outer gear 110a, 110b as an output gear at a speed reduced according to the compound gear ratio, and with torque increased according to the compound gear ratio.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. A compound harmonic drive comprising:
    an inner ring gear including a first set of gear teeth;
    a flex spline including a flex spline inner ring and a flex spline outer ring, the flex spline inner ring forms a second set of gear teeth that engage the first set of gear teeth and the flex spline outer ring forms a third set of gear teeth;
    an outer ring gear including a fourth set of gear teeth that are engaged by the third set of gear teeth; and a wave generator disposed between the flex spline inner ring and the flex spline outer ring, wherein the gear system rotates about an axis and each set of gear teeth is axially aligned with each other and radially offset from each other about the axis.

2. The drive of claim 1, wherein the first set of gear teeth on the inner ring gear faces outwardly to be engaged by the second set of gear teeth on the flex spline inner ring.

3. The drive of claim 2, wherein the fourth set of gear teeth on the outer ring gear faces inwardly to be engaged by the third set of gear teeth on the flex spline outer ring.

4. The drive of claim 1, wherein the wave generator is axially aligned with each set of gear teeth.

5. The drive of claim 1, wherein the wave generator forms an inner surface profile that faces the inner ring gear and an outer surface profile that faces the outer ring gear, both are non-circular.

6. The drive of claim 5, wherein the inner surface profile and the outer surface profile of the wave generator both include a plurality of lobes, wherein the lobes on the inner surface profile are circumferentially offset from the lobes on the outer surface profile.

7. The drive of claim 6, wherein the inner surface profile and the outer surface profile of the wave generator are different from one another.

8. The drive of claim 1, wherein the inner ring gear, the outer ring gear and the wave generator each have a same axial thickness.

9. The drive of claim 1, further comprising a set of wave generator inner bearings between the wave generator and the flex spline inner ring, the set of wave generator inner bearings being axially aligned with each set of gear teeth.

10. The drive of claim 9, further comprising a set of wave generator outer bearings between the wave generator and the flex spline outer ring, the set of wave generator outer bearings being axially aligned with each set of gear teeth.

11. The drive of claim 10, wherein the set of wave generator inner bearings and the set of wave generator outer bearings have the same axial thickness as the wave generator.

12. The drive of claim 10, wherein the set of wave generator inner bearings and the set of wave generator outer bearings are journal bearings.

13. The drive of claim 1, wherein the flex spline inner ring and the flex spline outer ring are connected to one another by a cup-shaped extension.

14. The drive of claim 13, wherein the cup-shaped extension forms a base that is axially spaced apart from each set of gear teeth.

15. The drive of claim 13, wherein the cup-shaped extension includes an inner side wall that forms the flex spline inner ring, and an outer side wall that forms the flex spline outer ring.

16. The drive of claim 1, wherein the inner ring gear forms a center opening to receive a shaft.

17. A method of transmitting rotational motion through a compound harmonic drive comprising:

rotating the wave generator of a gear system as an input;

rotating a flex spline of the gear system by the rotating wave generator, wherein the flex spline includes a flex spline inner ring and a flex spline outer ring, and wherein the inner ring gear forms a first set of gear teeth, the flex spline inner ring forms a second set of gear teeth that engage the first set of gear teeth, the flex spline outer ring forms a third set of gear teeth, the outer ring gear forms a fourth set of gear teeth that are engaged by the third set of gear teeth, and a wave generator is disposed between the flex spline inner ring and the flex spline outer ring; and rotating the inner ring gear or the outer ring gear by the rotating of the flex spline, wherein the drive rotates about an axis and each set of gear teeth is axially aligned with each other and radially offset from each other about the axis.

18. The method of claim 17, comprising grounding the outer ring gear, thereby rotating the inner ring gear as an output gear.

19. The method of claim 17, comprising at least one of meshing the first set of gear teeth and the second set of gear teeth according to an inner surface profile of the wave generator and meshing the third set of gear teeth and the fourth set of gear teeth according to an outer surface profile of the wave generator, wherein the inner and outer surface profiles each include a plurality of lobes.

20. The method of claim 19, comprising meshing both the first set of gear teeth and the second set of gear teeth according to the inner surface profile of the wave generator and meshing the third set of gear teeth and the fourth set of gear teeth according to the outer surface profile of the wave generator, wherein the lobes on the inner surface profile are circumferentially offset from the lobes on the outer surface profile.

* * * * *